(12) United States Patent
Nishigori

(10) Patent No.: US 9,560,277 B2
(45) Date of Patent: Jan. 31, 2017

(54) IMAGE PROCESSING APPARATUS AND IMAGE PROCESSING METHOD

(71) Applicant: CANON KABUSHIKI KAISHA, Tokyo (JP)

(72) Inventor: Hidetoshi Nishigori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 14/249,216

(22) Filed: Apr. 9, 2014

(65) Prior Publication Data

US 2014/0307111 A1    Oct. 16, 2014

(30) Foreign Application Priority Data

Apr. 15, 2013  (JP) ................................. 2013-085106
Mar. 7, 2014   (JP) ................................. 2014-045624

(51) Int. Cl.
  *H04N 5/232*  (2006.01)
  *G06T 5/00*   (2006.01)
  *H04N 5/357*  (2011.01)

(52) U.S. Cl.
  CPC ........... *H04N 5/23267* (2013.01); *G06T 5/006* (2013.01); *H04N 5/23212* (2013.01); *H04N 5/23254* (2013.01); *H04N 5/23274* (2013.01); *H04N 5/23296* (2013.01); *H04N 5/3572* (2013.01)

(58) Field of Classification Search
  CPC ............ H04N 5/23267; H04N 5/23274; H04N 5/23212; H04N 5/23296; H04N 5/3572; H04N 5/23254; G06T 5/006
  See application file for complete search history.

(56) References Cited

U.S. PATENT DOCUMENTS

2010/0002088 A1    1/2010 Ohta
2010/0295956 A1*  11/2010 Goto .................. H04N 5/23248
                                                           348/208.6

FOREIGN PATENT DOCUMENTS

CN        1992819 A     7/2007
CN        101902573 A   12/2010
JP        2005-252626 A 9/2005

* cited by examiner

*Primary Examiner* — Twyler Haskins
*Assistant Examiner* — Angel L Garces-Rivera
(74) *Attorney, Agent, or Firm* — Canon USA, Inc. IP Division

(57) ABSTRACT

An image processing apparatus performs distortion aberration correction appropriate for each of the cases where the image processing apparatus clips image data by performing electronic image stabilization and does not clip the image data by performing the electronic image stabilization. The image processing apparatus includes a correction unit configured to perform the distortion aberration correction on image data in which distortion aberration has, and a stabilization unit configured to perform clipping from the image data based on a movement of an imaging unit when the image data has been generated. The correction unit reduces an amount of the distortion aberration correction in a case where the stabilization unit does not clip the image data, as compared to a case where the stabilization unit clips the image data.

11 Claims, 9 Drawing Sheets

PRIOR ART

PRIOR ART

IMAGE PROCESSING APPARATUS AND IMAGE PROCESSING METHOD

BACKGROUND OF THE INVENTION

Field of the Invention

The present invention relates to a distortion aberration correction mechanism for correcting distortion aberration due to an imaging optical system by performing image processing. Further, the present invention relates to an image processing apparatus including a blurring correction mechanism for correcting a blur of an image formed on an image sensor due to a movement of an imaging apparatus.

Description of the Related Art

Japanese Patent Application Laid-Open No. 2005-252626 discusses an image processing apparatus including the following functions. The image processing apparatus includes a function for correcting distortion aberration unique to an imaging optical system by performing image processing. Further, the image processing apparatus includes a blurring correction function, i.e., an electronic image stabilization function, capable of correcting a blur of an object image caused by a movement of the imaging apparatus when capturing an image.

When image processing for reducing the distortion aberration is performed on an image in which the distortion aberration unique to the imaging optical system has occurred, a wide-angle distortion occurs in the image. The wide-angle distortion occurring in the image of a planar object is unnoticeable. However, the wide-angle distortion occurring in the image of a solid object is noticeable. In particular, when the image is captured by setting an image angle of the imaging optical system including a zoom function to a wide angle, a large amount of distortion aberration occurs in the image. Therefore, the wide-angle distortion, which occurs when the distortion aberration is corrected, also becomes large.

When the wide-angle distortion occurs, the object in a peripheral portion of a screen is stretched in an image height direction of the screen. In such a case, the image causes a strong feeling of strangeness to a user particularly when the wide-angle distortion occurs with respect to a face of a person.

FIG. 7A is a schematic diagram illustrating an image in which the distortion aberration has been well corrected. As illustrated in FIG. 7A, planar shapes formed on linear lines appear to be normal. However, the wide-angle distortion tends to occur on the solid object, such as the face of the person, in the peripheral portion of the screen, so that the image causes a feeling of strangeness to the user. FIG. 7B is a schematic diagram illustrating an image in which a barrel-type distortion aberration remains. As illustrated in FIG. 7B, the planar shapes formed on the linear lines are distorted, so that the image causes a feeling of strangeness to the user. However, the solid object, such as the face of the person, in the peripheral portion of the screen appears to be relatively normal in the image. Therefore, when a large amount of distortion aberration has occurred, the image with comparatively satisfactory planar shapes formed on the linear lines as well as comparatively satisfactory wide-angle distortion can be obtained by the correction leaving a small amount of distortion.

On the other hand, an electronic image stabilization processing, as image stabilization processing, reduces a blur of an image caused by the shake of the imaging apparatus. The electronic image stabilization processing shifts a clipping area to be actually output (i.e., recorded or displayed) from the image according to the shake of the imaging apparatus, and thus reduces the blur of the image.

However, if there is distortion aberration left in the image generated by using the output from the image sensor when a moving image is captured, a state of the distortion aberration included in a clipped image changes according to a change in a position of the clipping area to be actually output. FIGS. 8A, 8B, and 8C are schematic diagrams illustrating changes in the state of the distortion aberration left in each clipping area according to the change in the position of the clipping area. More specifically, FIGS. 8B and 8C illustrate the images generated from the image illustrated in FIG. 8A by changing the clipping positions. The states of the distortion aberrations left in the respective images illustrated in FIGS. 8B and 8C are thus different. As a result, the difference in the distortion aberrations left in the images becomes noticeable due to the change in the clipping positions in the moving image in which such images continue.

Further, if brightness of the object is low, a combining method may be performed as follows. Imaging is performed a plurality of times to obtain a plurality of image data, and the same object is detected from each of the obtained plurality of the image data. The positions of the plurality of the image data are then adjusted so that positions of the same object included in each of the plurality of the image data match each other, and the plurality of the image data is combined.

In such a case, if the position of the same object on the image sensor is different among the plurality of images, the state of distortion aberration left in the object also becomes different among the plurality of images. FIGS. 9A, 9B, 9C, and 9D are diagrams illustrating the change among the plurality of images in the state of distortion aberration left in each image, which has been clipped according to the object, caused by a shift in the position of the object on the image sensor. More specifically, FIGS. 9B and 9C illustrate the images in which the clipping positions are different, generated from the image illustrated in FIG. 9A. In such a case, the state of the distortion aberration left in each image is different. Therefore, if such images are combined, the image in which differently-shaped object images are combined is generated even when the object is the same. As a result, the object becomes blurred in the image.

SUMMARY OF THE INVENTION

According to an aspect of the present invention, an image processing apparatus includes a correction unit configured to perform distortion aberration correction on image data in which distortion aberration has occurred, and a stabilization unit configured to perform image stabilization processing in which partial image data is clipped from the image data based on a movement of an imaging unit when the image data has been generated, wherein the correction unit reduces an amount of the distortion aberration correction in a case where the image stabilization processing is not performed, as compared to a case where the image stabilization processing is performed.

According to another aspect of the present invention, an image processing apparatus includes a distortion aberration correction unit configured to perform distortion aberration correction on a plurality of image data in which distortion aberration has occurred due to an imaging optical system, and a combining unit configured to perform combining processing for combining the plurality of the image data by adjusting positions of the plurality of the image data based on a position of an object included in each piece of the plurality of the image data, wherein the distortion aberration correction unit reduces an amount of the distortion aberration correction in a case where the combining processing is not performed, as compared to a case where the combining processing is performed.

According to yet another aspect of the present invention, an image processing apparatus includes a distortion aberration correction unit configured to perform distortion aberration correction on image data in which distortion has occurred due to an imaging optical system, and a clipping unit configured to clip partial image data from the image data, wherein the distortion aberration correction unit reduces an amount of the distortion aberration correction in a case where the partial image data is not clipped, as compared to a case where the partial image data is clipped.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
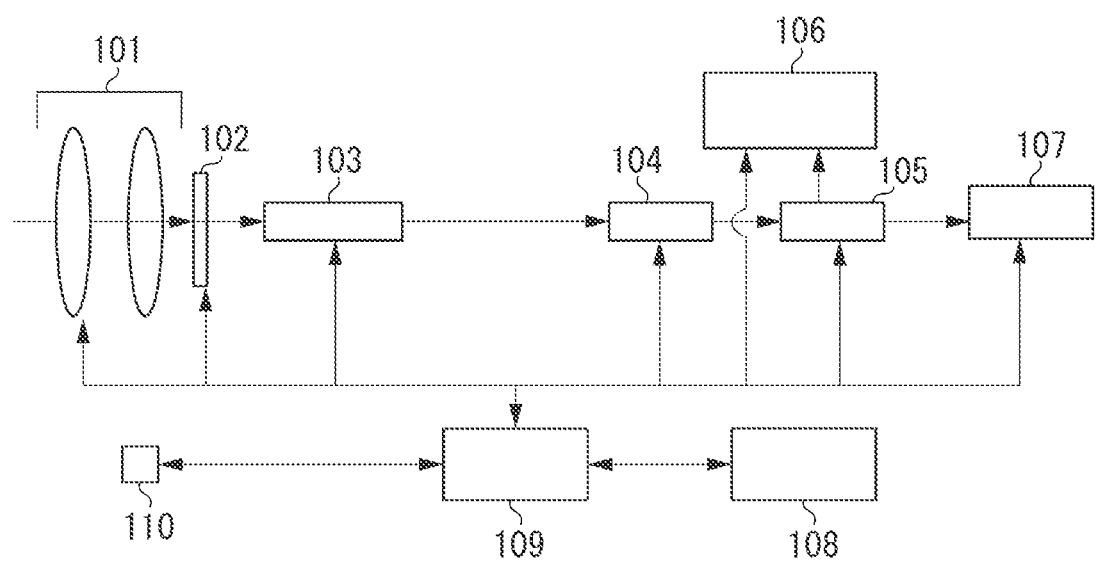
FIG. 1 is a block diagram illustrating a configuration of an imaging apparatus as an example of an image processing apparatus according to an exemplary embodiment of the present invention.

FIG. 1 is a block diagram illustrating a configuration of an imaging apparatus as an example of an image processing apparatus according to an exemplary embodiment of the present invention. According to the present exemplary embodiment, the imaging apparatus including an electronic image stabilization function and a distortion aberration correction function will be described as an example. However, the present invention is not limited thereto. The present invention is applicable to an image processing apparatus which is separated from the imaging apparatus, as long as the image processing apparatus includes the following functions, i.e., a function for clipping the image based on shake information when capturing the image, or a function for aligning and combining a plurality of images, and a function for correcting the distortion aberration.

As illustrated in FIG. 1, an imaging optical system 101 includes a lens group having a plurality of lenses, and is capable of changing a focus position and a zoom ratio. An image sensor 102 receives light passing through the imaging optical system 101, performs photoelectric conversion, and generates an analog signal corresponding to the object. The imaging optical system 101 and the image sensor 102 configure an imaging unit. An analog/digital (A/D) conversion unit 103 converts the analog signal generated by the image sensor 102 to a digital signal, and generates the image data.

A temporary memory 104 temporarily stores the image data generated by the A/D conversion unit 103. An image processing circuit 105 performs image processing, such as white-balance processing, distortion aberration correction, electronic image stabilization processing, and combining processing, to the image data read from the temporary memory 104. A monitor 106, which includes a compact liquid crystal display, displays the image using the image data processed by the image processing circuit 105. A recording circuit 107 converts the image data output from the image processing circuit 105 to a format, such as the Joint Photographic Experts Group (JPEG) format, and records the converted image data.

An operation unit 108 is used by a user to input various instructions to the imaging apparatus. A control circuit 109 controls operations performed by each unit illustrated in FIG. 1. Further, the control circuit 109 performs control according to the instruction from the operation unit 108. A motion detection circuit 110 detects the shake of the imaging unit when the user is capturing an image, and outputs the movement of the imaging apparatus to the control circuit 109. For example, the motion detection circuit 110 detects the movement of the imaging apparatus based on output from an angular velocity sensor included in the imaging apparatus, or a motion vector obtained by comparing the plurality of captured images. Further, the control circuit 109 transmits the clipping position of the image to the image processing circuit 105 when the electronic image stabilization is performed, based on movement information obtained from the motion detection circuit 110. Furthermore, the control circuit 109 is capable of detecting a specific object, such as a person, from the image data.

The operations of the imaging apparatus according to a first exemplary embodiment of the present invention will be described below.

When the user turns on a power switch (not illustrated) in the operation unit 108, power is supplied to each of the units included in the imaging apparatus. The light from the object image, which has passed through the imaging optical system 101, forms an image on the imaging sensor 102, and the image sensor 102 outputs the photoelectric-converted analog signal to the A/D conversion unit 103. The A/D conversion unit 103 converts the analog signal input thereto to the digital signal and generates the image data. The temporary memory 104 then stores the generated image data. The image processing circuit 105 performs the white-balance processing on the image data read from the temporary memory 104.

If the imaging apparatus is preset via the operation unit 108 not to perform the electronic image stabilization, the image processing circuit 105 performs as follows. The image processing circuit 105 generates the image data by performing the distortion aberration correction on an image data subjected to the white balance processing, without clipping partial image data subjected to the white balance processing. The control circuit 109 then causes the monitor 106 to display the image based on the generated image data.

On the other hand, if the imaging apparatus is preset via the operation unit 108 to perform the electronic image stabilization, the control circuit 109 sets the clipping position of the image based on an amount of movement detected by the motion detection circuit 110. The image processing circuit 105 then clips the image data from an image subjected to the white-balance processing and distortion aberration correction, according to the position set by the control circuit 109. The control circuit 109 causes the monitor 106 to display the image based on the clipped image data. Parameters used for distortion aberration correction are different from the parameters used for distortion aberration correction when the image apparatus is set not to perform the electronic image stabilization. Such a difference will be described below.

The imaging apparatus repeats the above-described process until receiving a switch (SW) 1 signal notification (i.e., a notification of the shutter switch being half-pressed) from a shutter switch in the operation unit 108. Then, the moving image is displayed on the monitor 106.

If the control circuit 109 receives the SW1 signal notification from the shutter switch in the operation unit 108, the control circuit 109 performs auto-focus control and auto-exposure control by using the generated image data. The control circuit 109 thus obtains an optimal focus and an exposure setting condition for capturing the image.

If the imaging apparatus receives a SW2 signal notification (i.e., a notification of the shutter switch being full-pressed) from the shutter switch in the operation unit 108, the imaging apparatus performs main imaging processing. More specifically, the image processing circuit 105 performs the processes on the image data according to each setting based on whether the imaging apparatus is set to perform the electronic image stabilization. The image processing circuit 105 then converts the processed image data to a format, such as the JPEG format, and the recording circuit 107 records the converted image data.

The change in the parameters for performing the distortion aberration correction according to whether the imaging apparatus is set to perform the electronic image stabilization will be described below.

Figure 2A:
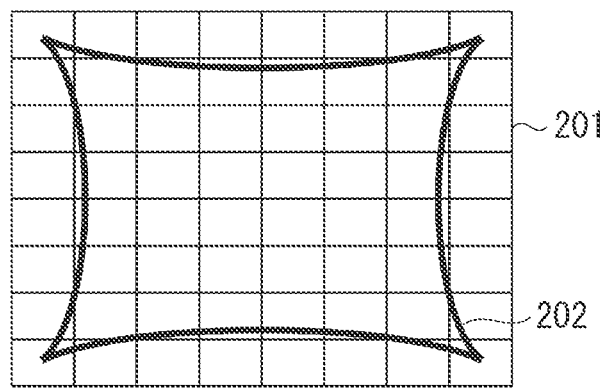
FIGS. 2A, 2B, and 2C are diagrams illustrating an amount of distortion aberration correction in a case where the imaging apparatus does not perform electronic image stabilization.
Figure 2B:
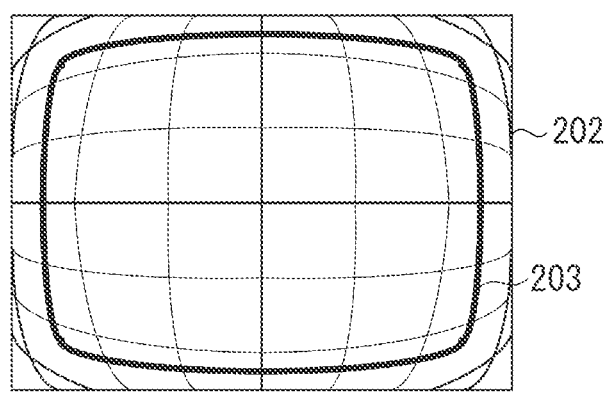
Figure 2C:
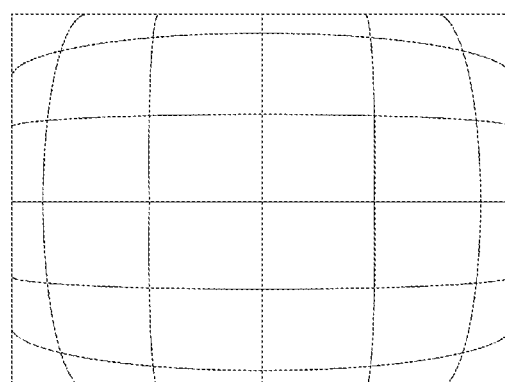

FIGS. 2A, 2B, and 2C are schematic diagrams illustrating a processing state of the distortion aberration correction in a case where the imaging apparatus does not perform the electronic image stabilization. As illustrated in FIG. 2A, if the barrel-type distortion aberration has been caused in the image by the imaging optical system 101, an imaging range 202, which is distorted in a barrel shape, among a grid-like object 201 is formed as an image on the image sensor 102.

If the imaging apparatus then performs correction so that the distortion aberration unique to the imaging optical system 101 is completely corrected, the distortion of the planar object image can be reduced. However, the wide-angle distortion of the solid object becomes noticeable. If the amount of distortion aberration is large as when the angle of view of the imaging optical system 101 including the zoom function is set to the wide angle, the image processing circuit 105 performs distortion aberration correction so as to purposely leave a small amount of barrel-type distortion. As a result, the image processing circuit 105 generates the image in which the distortion aberration in the planar shapes formed on the linear lines and the wide-angle distortion are both unnoticeable. In such a case, the distortion aberration correction parameters are adjusted in advance according to the amount of the wide-angle distortion generated by performing the distortion aberration correction. The image processing circuit 105 then performs the distortion aberration correction so that a corrected range 203 among the imaging range 202 becomes the output image, as illustrated in FIG. 2B. The image processing circuit 105 thus outputs an image in which a small amount of barrel-type distortion is left as image data subjected to the distortion aberration correction, as illustrated in FIG. 2C.

Figure 3A:
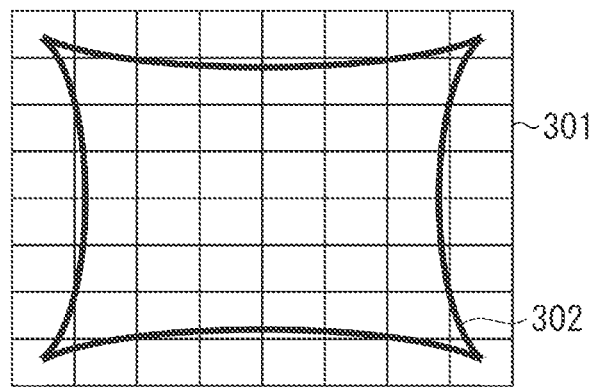
FIGS. 3A, 3B, and 3C are diagrams illustrating an amount of distortion aberration correction in a case where the imaging apparatus performs the electronic image stabilization.
Figure 3B:
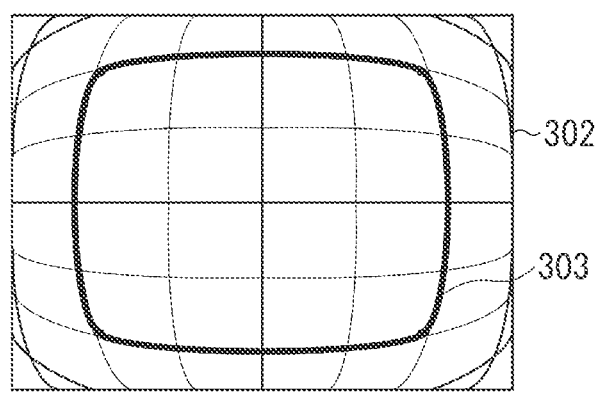
Figure 3C:
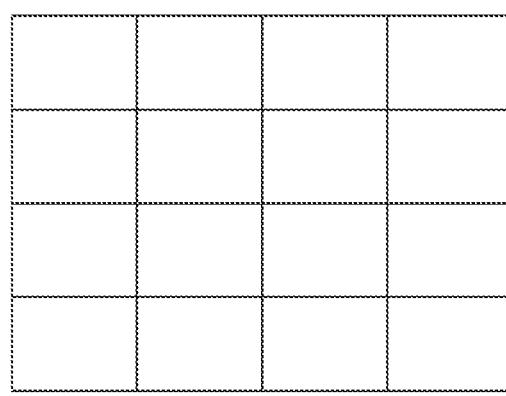

FIGS. 3A, 3B, and 3C are schematic diagrams illustrating a processing state of the distortion aberration correction state in a case where the imaging apparatus performs the electronic image stabilization. As illustrated in FIG. 3A, if the barrel-type distortion aberration has been caused in the image by the imaging optical system 101, an imaging range 302, which is distorted in the barrel shape, among a grid-like object 301 is formed as an image on the image sensor 102.

The imaging apparatus performs the electronic image stabilization processing to reduce the blur of an image caused by the shake thereof. The imaging apparatus thus performs image clipping from an image on which the image processing circuit 105 has performed the distortion aberration correction, at a position according to the motion information of the imaging apparatus detected by the motion detection circuit 110. As illustrated in FIG. 2C, when a portion of the image data in which the barrel-type distortion has been left is clipped, a shape of the distortion aberration left in the image changes for each frame by shifting of the clipping position. Therefore, if the distortion aberration is left when the imaging apparatus captures a moving image by using the electronic image stabilization, the difference in the shapes of the distortion aberration between the frames becomes noticeable. The image thus causes a feeling of strangeness to the user. When capturing a moving image by using the electronic image stabilization, the imaging apparatus according to the present invention sets the distortion aberration correction parameters as follows. The imaging apparatus sets the distortion aberration correction parameters so that a smaller amount of distortion aberration is left as compared to when not performing the electronic image stabilization. For example, the image processing circuit 105 performs the distortion aberration correction so that a corrected range 303 among the imaging range 302 becomes an output image, as illustrated in FIG. 3B. The image processing circuit 105 then outputs an image in which the barrel-type distortion hardly remains as image data subjected to the distortion aberration correction, as illustrated in FIG. 3C.

Figure 4A:
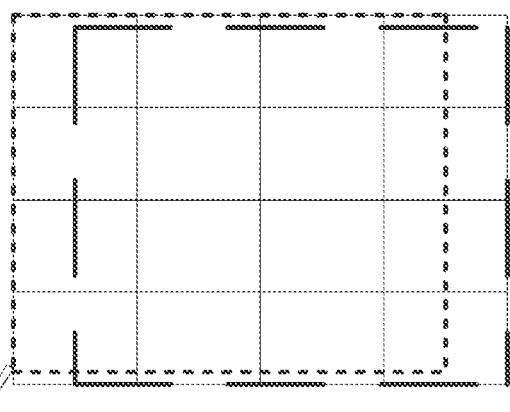
FIGS. 4A, 4B, and 4C are diagrams illustrating clipping positions of an output image when the imaging apparatus performs the electronic image stabilization.
Figure 4B:
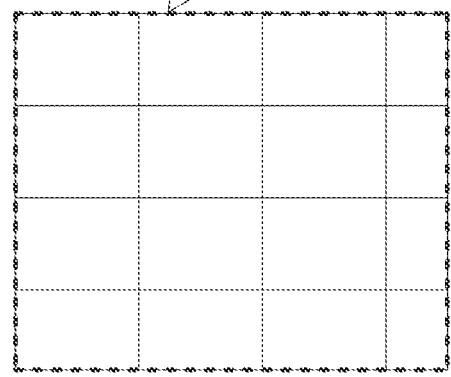
Figure 4C:
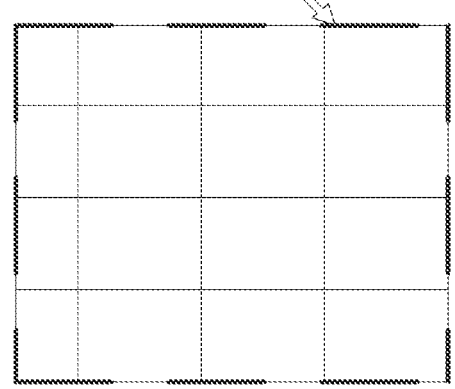

FIGS. 4A, 4B, and 4C are schematic diagrams illustrating clipping performed on an image in which distortion aberration hardly remains for performing the electronic image stabilization processing.

More specifically, FIG. 4A illustrates an image data corrected by the image processing circuit 105 so that the distortion aberration hardly remains. As illustrated in FIGS. 4B and 4C, even if image data is clipped from the image illustrated in FIG. 4A by changing the clipping positions, the user hardly feels strangeness due to the difference in the state of the distortion aberration.

Furthermore, if the imaging apparatus performs the electronic image stabilization, the output image is clipped from the image on which the image processing circuit 105 has performed the distortion aberration correction. As a result, the area in which the wide-angle distortion has occurred due to the distortion aberration correction may be excluded, depending on the clipping position.

As described above, if the image processing apparatus according to the present exemplary embodiment performs the electronic image stabilization, the distortion aberration correction parameters are set so that the amount of distortion aberration correction becomes greater as compared to when the image processing apparatus does not perform the electronic image stabilization. In other words, if the image processing apparatus does not perform the electronic image stabilization, the distortion aberration correction parameters are set so that the amount of wide-angle distortion which occurs due to the distortion aberration correction becomes smaller as compared to when the image processing apparatus performs the electronic image stabilization.

With such an arrangement, if the change in the shape of the distortion aberration between frames in a moving image is noticeable by performing the electronic image stabilization, the distortion aberration correction is prioritized over the wide-angle distortion. The image processing apparatus thus becomes capable of generating the moving image causing little feeling of strangeness to the user. In contrast, if the image processing apparatus does not perform the electronic image stabilization, the image processing apparatus purposely leaves the distortion aberration. With such an arrangement, the image processing apparatus becomes capable of generating the image causing little feeling of strangeness due to the wide-angle distortion to the user.

According to the above-described exemplary embodiment, the amount of the distortion aberration correction is changed according to whether the imaging apparatus performs the electronic image stabilization. However, the present invention is not limited thereto. The following may be performed even when the image processing apparatus performs the electronic image stabilization on a moving image. If the image processing apparatus performs the distortion aberration correction on a moving image obtained by actual shooting for recording on a recording medium, the amount of distortion aberration correction may be reduced, as compared to when performing the distortion aberration correction in a moving image other than the moving image obtained by the actual shooting. The moving image, which is not obtained by the actual shooting, is the moving image generated for observing the object before the actual shooting. In other words, only the feeling of strangeness with respect to a moving image to be stored caused by the change in the shape of the distortion aberration is considered. The feeling of strangeness with respect to a moving image, which is not to be stored, caused by the change in the shape of the distortion aberration is thus not considered.

Further, it is hardly necessary for the image processing apparatus to perform the electronic image stabilization shifting the clipping position on a still image. Therefore, if the image processing apparatus captures a still image, the distortion aberration correction parameters may be set so that the amount of distortion aberration correction becomes greater, as compared to when capturing a moving image.

Furthermore, a small amount of the distortion aberration is left in a case where a predetermined condition that the amount of the distortion aberration becomes large is satisfied, for example, when the imaging optical system 101 is set to the wide angle side. The amount of the distortion aberration correction may thus be the same for other cases, regardless of whether the image processing apparatus performs the electronic image stabilization.

An operation of the imaging apparatus according to a second exemplary embodiment of the present invention will be described below.

According to the first exemplary embodiment, the parameters used for performing the distortion aberration correction are changed according to whether the imaging apparatus performs the electronic image stabilization with respect to a moving image. In contrast, according to the present exemplary embodiment, the parameters used for performing the distortion aberration correction are changed according to whether the imaging apparatus performs the combining processing of a plurality of still images. According to the present exemplary embodiment, the differences from the first exemplary embodiment will be mainly described below.

The control circuit 109 determines, if the operation unit 108 has preset the combining processing to be performed, or if it is determined that an exposure time for obtaining an image of an appropriate brightness has exceeded a threshold value, that still images are combined.

If the control circuit 109 determines that it is not necessary to combine still images, the imaging apparatus once captures a still image upon receiving the notification signal of the SW2. The image processing circuit 105 then performs the image processing including the white-balance processing and the distortion aberration correction on the captured still image, and the image data is generated.

On the other hand, if the control circuit 109 determines that still images are to be combined, the imaging apparatus captures a still image for a plurality of times upon receiving the notification signal of the SW2. The image processing circuit 105 then performs the image processing including the white-balance processing and the distortion aberration correction on each of the plurality of captured still images, and generates a plurality of image data. The control circuit 109 detects the same object from each of the plurality of the image data. It is presumed that the control circuit 109 detects a person from the plurality of the image data. The image processing circuit 105 then adjusts positions of the plurality of the image data so that the positions of the same object (i.e., person) match each other, and thus combines the plurality of the image data.

In the imaging apparatus according to the present exemplary embodiment, if the imaging apparatus performs the combining processing, the image processing circuit 105 sets the distortion aberration correction parameters so that a smaller amount of distortion aberration is left as compared to when the imaging apparatus does not perform the combining processing. For example, the image processing circuit 105 performs the distortion aberration correction so that the corrected range 303 among the imaging range 302 becomes the output image, as illustrated in FIG. 3B. The image processing circuit 105 thus generates image data in which the barrel-type distortion hardly remains, as illustrated in FIG. 3C. The image processing circuit 105 then detects a position of the same object from each of a plurality of the image data by using the plurality of the image data in which the barrel-type distortion hardly remains. The image processing circuit 105 adjusts the combining positions of the plurality of the image data so that the positions of the same object overlap.

FIGS. 5A, 5B, 5C, and 5D are schematic diagrams illustrating clipping performed for the combining processing on the image data in which the distortion aberration hardly remains.

Figure 5A:
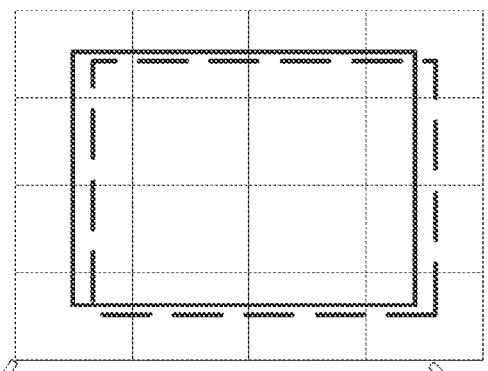
FIGS. 5A, 5B, 5C, and 5D are diagrams illustrating clipping positions of an output image when the imaging apparatus performs the electronic image stabilization.
Figure 5B:
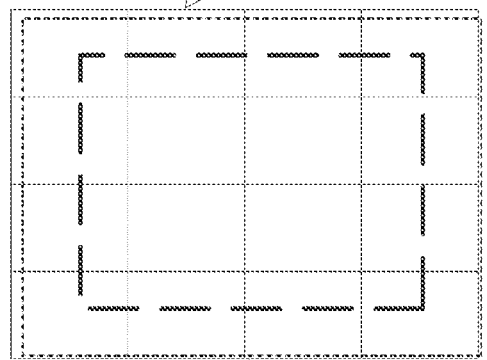
Figure 5C:
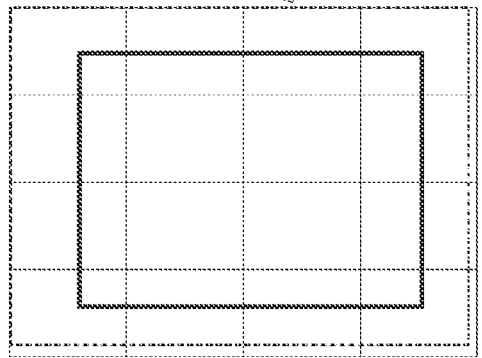
Figure 5D:
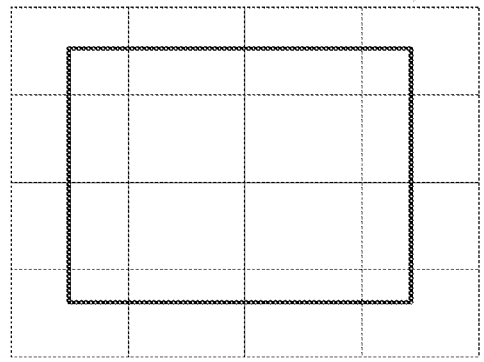

More specifically, FIG. 5A illustrates the image data corrected by the image processing circuit 105 so that the distortion aberration hardly remains. The shape of the distortion aberration in the same object becomes similar between each of the plurality of the image data, as illustrated in FIGS. 5B and 5C. As a result, when the plurality of the image data is combined as illustrated in FIG. 5D, a superposition error can be reduced.

Figure 6A:
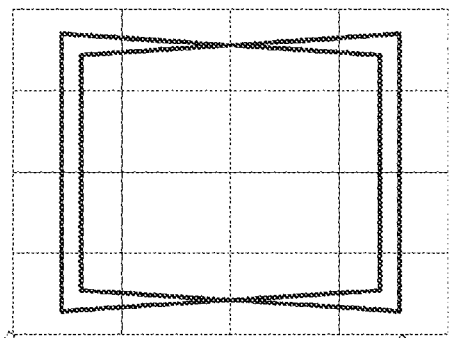
FIGS. 6A, 6B, 6C, 6D, 6E, and 6F are diagrams illustrating clipping positions of an output image when the imaging apparatus performs the electronic image stabilization and projection transformation.
Figure 6B:
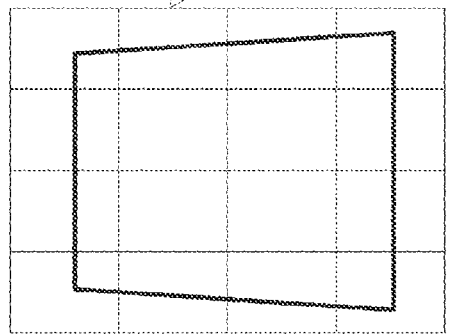
Figure 6C:
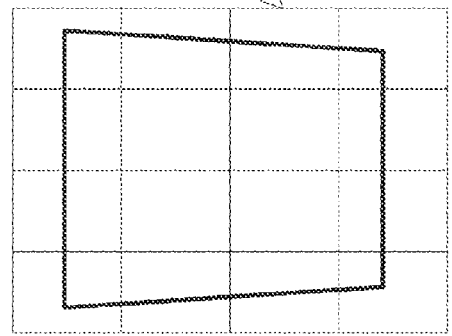
Figure 6D:
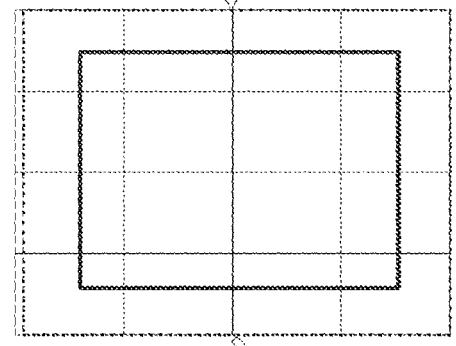
Figure 6E:
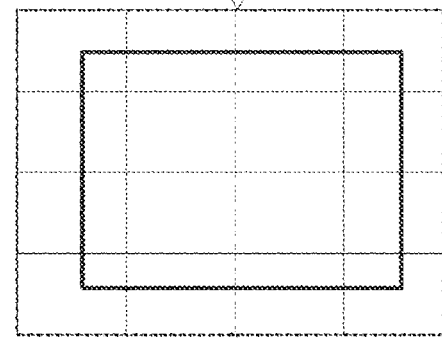
Figure 6F:
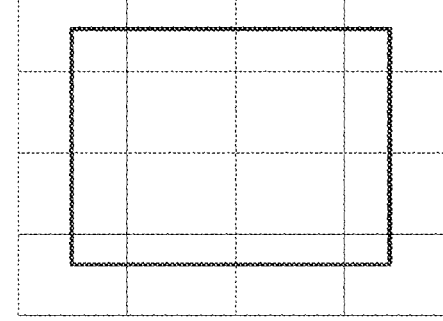
Figure 7A:
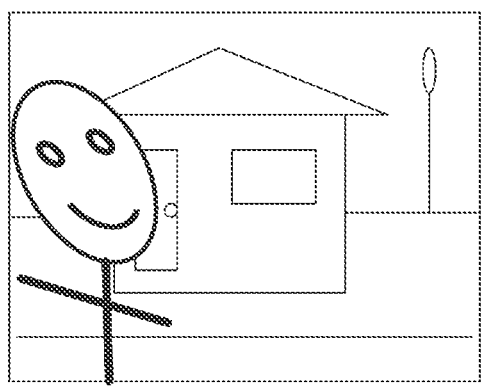
FIGS. 7A and 7B are schematic diagrams illustrating a relation between the distortion aberration and a wide-angle distortion.
Figure 7B:
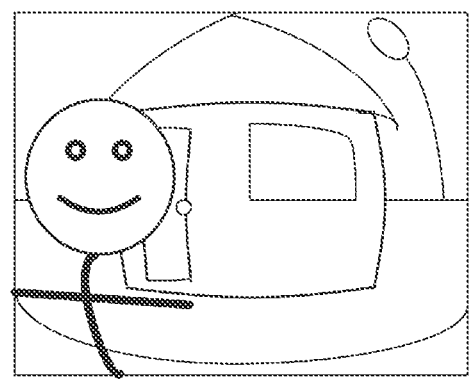
Figure 8A:
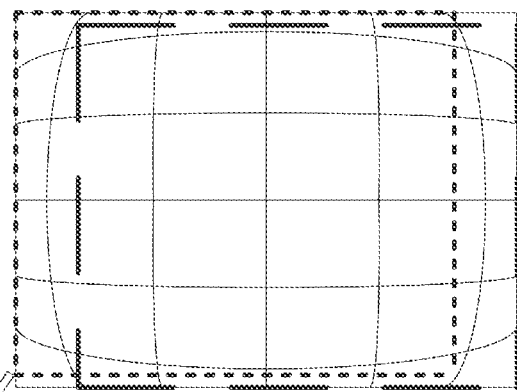
FIGS. 8A, 8B, and 8C are schematic diagrams illustrating a relation between the distortion aberrations and clipping positions of an output image by the electronic image stabilization.
Figure 8B:
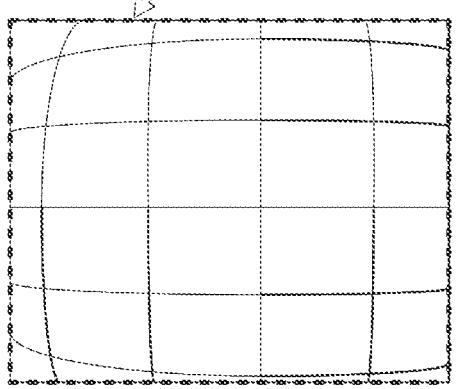
Figure 8C:
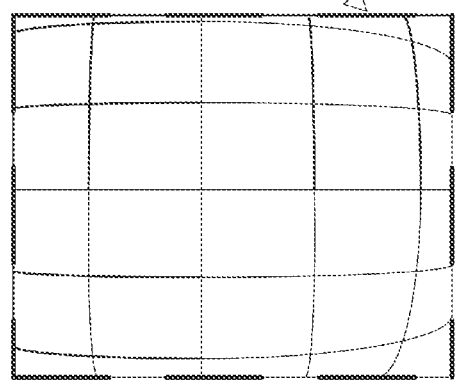
Figure 9A:
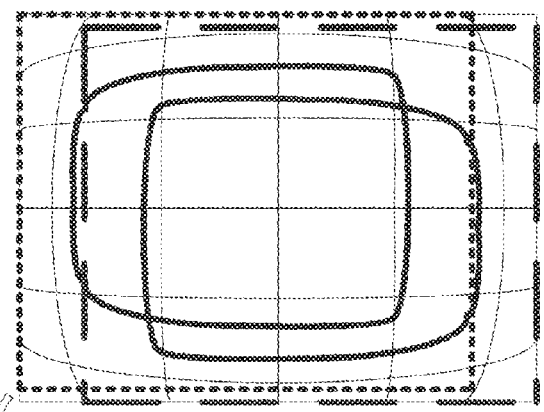
FIGS. 9A, 9B, 9C, and 9D are schematic diagrams illustrating a relation between the distortion aberrations and combining positions of output images by the electronic image stabilization.
Figure 9B:
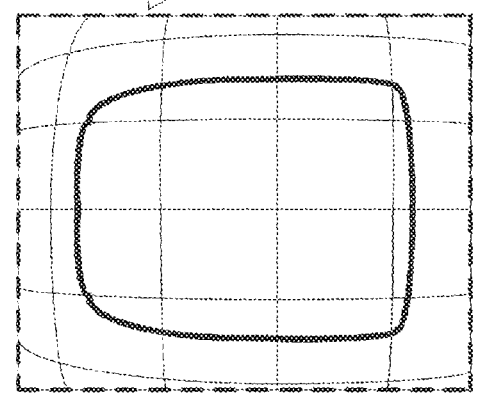
Figure 9C:
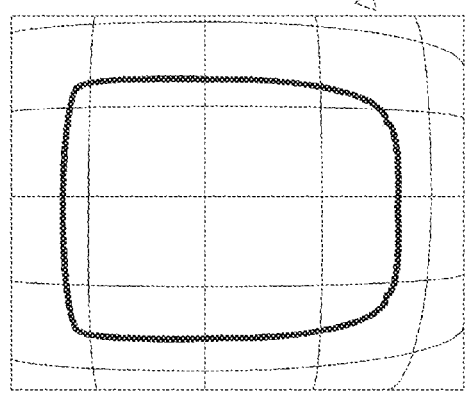
Figure 9D:
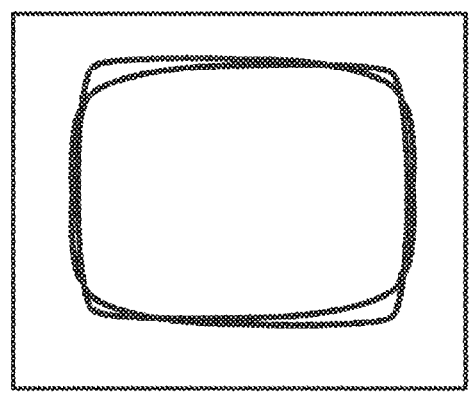

FIGS. 6A, 6B, 6C, 6D, 6E and 6F are schematic diagrams illustrating the combining processing for the image data on which the distortion aberration correction and a projection transformation have been performed. More specifically, FIG. 6A illustrates image data corrected by the image processing circuit 105 so that the distortion aberration hardly remains. The projection transformation processing is then performed on the image data in which a trapezoidal distortion aberration has occurred due to tilting of the imaging apparatus, as illustrated in FIGS. 6B and 6C. As a result, the trapezoidal distortion is accurately corrected in the image data processed by the projection transformation, as illustrated in FIGS. 6D and 6E. The superposition error in the combined image data is thus reduced, as illustrated in FIG. 6F.

Further, if the imaging apparatus performs the combining processing, the imaging apparatus deletes the area, which do not overlap with the other images, in each of the images. In other words, the imaging apparatus clips only the area, which overlaps with the other images. The wide-angle distortion in the peripheral portion of the image tends to become large. However, it is highly likely that such a portion is deleted when the imaging apparatus combines the images since such a portion does not overlap with the other images. Thus, the image in which the wide-angle distortion is unnoticeable can be generated.

As described above, when the image processing apparatus according to the present exemplary embodiment performs the combining processing, the distortion aberration correction parameters are set so that the amount of distortion aberration correction becomes greater as compared to when not performing the combining processing. In other words, if the image processing apparatus does not perform the combining processing, the distortion aberration correction parameters are set so that the amount of distortion aberration correction becomes smaller as compared to when performing the combining processing.

With such an arrangement, if the image processing apparatus performs the combining processing, the image processing apparatus can generate image data in which the superposition error of the image is small by prioritizing the distortion aberration correction over the wide-angle distortion. On the other hand, if the image processing apparatus does not perform the combining processing, the image processing apparatus purposely leaves the distortion aberration. Therefore, an image causing little feeling of strangeness due to the wide-angle distortion can be generated.

If the same object cannot be detected among a plurality of images, or if the difference in positions of the same object between the plurality of images is greater than a threshold value, the image processing apparatus may determine not to perform the combining processing on image data. If the image processing apparatus does not combine the plurality of image data, the image superposition error does not occur, so that reduction of the wide-angle distortion becomes prioritized.

Further, the image processing apparatus may perform correction in which the distortion aberration is purposely added to reduce the wide-angle distortion after combining a plurality of images. By performing such a process, the superposition error caused by combining image data, and the wide-angle distortion, can be reduced.

Furthermore, the distortion aberration is added in a case where predetermined conditions that the distortion aberration becomes large are satisfied, such as when the imaging optical system is set to the wide angle side. The amount of distortion aberration correction may be set the same for the other cases regardless of whether the imaging apparatus performs the electronic image stabilization.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-085106 filed Apr. 15, 2013, and No. 2014-045624 filed Mar. 7, 2014, which are hereby incorporated by reference herein in their entirety.

What is claimed is:

1. An image processing apparatus comprising:
   a correction unit configured to perform distortion aberration correction on image data in which distortion aberration has occurred; and
   a stabilization unit configured to perform image stabilization processing in which partial image data is clipped from the image data based on a movement of an imaging unit when the image data has been generated,
   wherein the correction unit reduces an amount of the distortion aberration correction in a case where the image stabilization processing is not performed, as compared to a case where the image stabilization processing is performed.

2. The image processing apparatus according to claim 1, wherein the correction unit reduces an amount of the distortion aberration correction in a case where the distortion aberration correction is performed on moving image data, as compared to a case where the distortion aberration correction is performed on still image data.

3. The image processing apparatus according to claim 1, wherein the stabilization unit clips the partial image data from image data on which the correction unit has performed the distortion aberration correction.

4. The image processing apparatus according to claim 1, wherein the correction unit equalizes, in the case where an optical system satisfies predetermined conditions, an amount of the distortion aberration correction when the image stabilization processing is not performed and that when the image stabilization processing is performed.

5. An image processing apparatus comprising:
a correction unit configured to perform distortion aberration correction on image data in which distortion has occurred; and
a clipping unit configured to clip partial image data from the image data,
wherein the correction unit reduces an amount of the distortion aberration correction in a case where the partial image data is not clipped, as compared to a case where the partial image data is clipped.

6. An image processing method comprising:
performing distortion aberration correction on image data in which distortion aberration has occurred;
performing an image stabilization process in which partial image data is clipped from the image data based on a movement of an imaging unit when the image data has been generated; and
reducing, when performing the distortion aberration correction, an amount of the distortion aberration correction in a case where the image stabilization processing is not performed, as compared to a case where the image stabilization process is performed.

7. A computer-readable non-volatile storage medium storing a program that causes a computer in an image processing apparatus to execute an image processing method according to claim 6.

8. The image processing method according to claim 6, wherein the reducing reduces an amount of the distortion aberration correction in a case where the distortion aberration correction is performed on moving image data, as compared to a case where the distortion aberration correction is performed on still image data.

9. An image processing method comprising:
performing distortion aberration correction on image data in which distortion aberration has occurred;
clipping partial image data from the image data; and
reducing an amount of the distortion aberration correction in a case where the partial image data is not clipped, as compared to a case where the partial image data is clipped.

10. A computer-readable non-volatile storage medium storing a program that causes a computer in an image processing apparatus to execute an image processing method according to claim 9.

11. The image processing method according to claim 9, wherein the reducing reduces an amount of the distortion aberration correction in a case where the distortion aberration correction is performed on moving image data, as compared to a case where the distortion aberration correction is performed on still image data.

* * * * *